United States Patent [19]

Miller et al.

[11] 3,858,968
[45] Jan. 7, 1975

[54] FILM CARTRIDGE

[75] Inventors: Stephen H. Miller; Robert C. Sutliff; Archie J. Tucker; Neil S. White; Bruce L. Elle, all of Rochester, N.Y.

[73] Assignee: Eastman Kodak Company, Rochester, N.Y.

[22] Filed: Feb. 26, 1973

[21] Appl. No.: 336,142

[52] U.S. Cl............... 352/78 R, 352/156, 242/194
[51] Int. Cl. ............................................ G03b 23/02
[58] Field of Search............. 352/72, 78, 78 C, 156; 242/197, 71.1, 194; 95/31 CA

[56] References Cited
UNITED STATES PATENTS

| | | | |
|---|---|---|---|
| 3,208,686 | 9/1965 | Edwards et al. | 352/78 R X |
| 3,480,226 | 11/1969 | Roman | 352/78 R |
| 3,514,197 | 5/1970 | Sho | 352/72 X |
| 3,542,306 | 11/1970 | Bundschuh | 242/71.1 |
| 3,580,665 | 5/1971 | Bassett | 352/78 R |
| 3,599,894 | 8/1971 | Edwards | 352/72 X |
| 3,623,679 | 11/1971 | Neudecker et al. | 352/156 X |
| 3,705,763 | 12/1972 | Almstead | 352/78 R |
| 3,718,301 | 4/1973 | Morton | 242/197 |
| 3,791,723 | 2/1974 | Komazaki | 352/129 X |

Primary Examiner—Samuel S. Matthews
Assistant Examiner—Alan Mathews
Attorney, Agent, or Firm—D. D. Schaper

[57] ABSTRACT

A film cartridge loaded with a roll of motion picture film having a magnetic stripe on one surface of the film is subject to shaking or impacts during handling of the cartridge which results in displacement of some convolutions of the film in a direction parallel to the axis of the film roll, especially when the film has first clocksprung in a radial direction. When this occurs, friction between the displaced convolution and the adjacent convolutions of the film effectively prevents return of the stepped convolution to its original position. Subsequently, when film is to be pulled from the supply roll during operation of a camera in which the cartridge is positioned, the stepped convolutions can contact a wall of the cartridge defining the supply chamber in the cartridge and produce a frictional force that opposes normal unwinding of the film. This can result in improperly exposed film. In order to avoid the undesirable results from stepped film, the film supply chamber is expanded in a direction parallel to the axis of the roll when the cartridge is inserted into the camera and/or the innermost convolution of film is secured against rotation until the cartridge is positioned in a camera so that clockspringing and stepping of the film is avoided.

6 Claims, 6 Drawing Figures

PATENTED JAN 7 1975

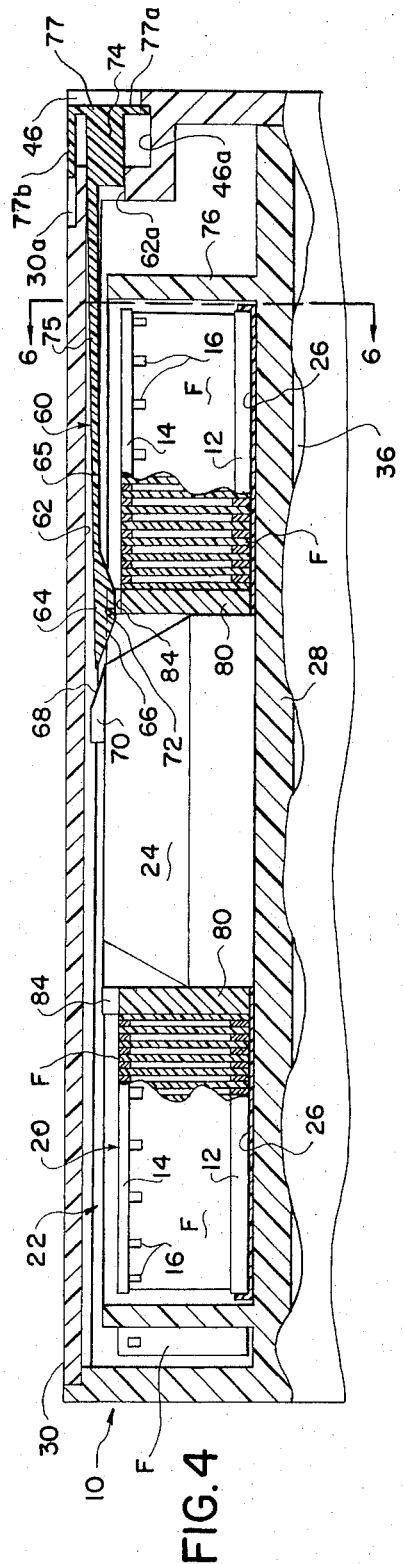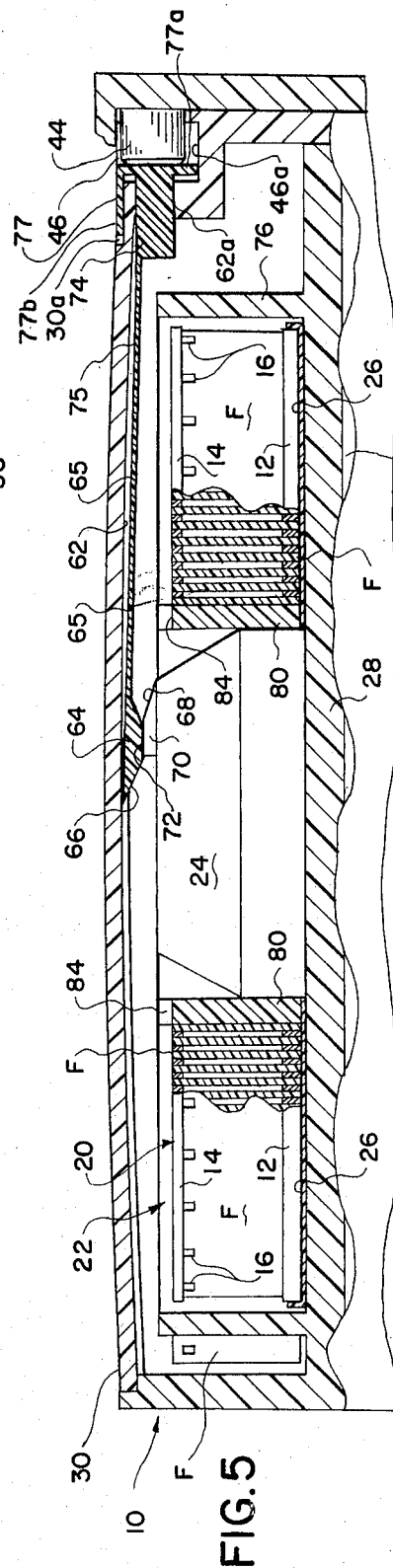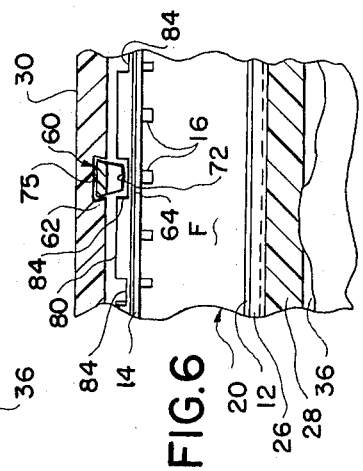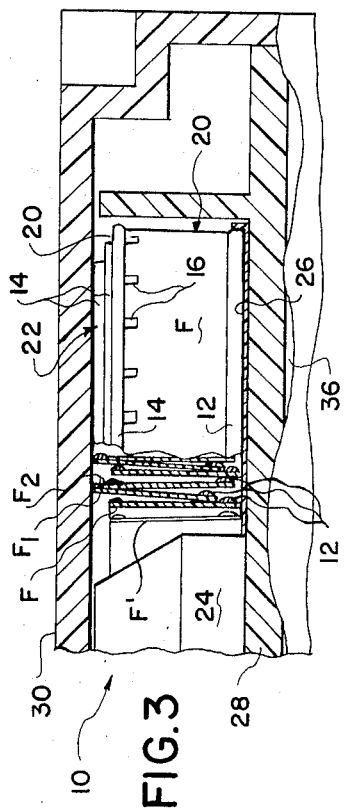

FILM CARTRIDGE

BACKGROUND OF THE INVENTION

1. Field of the Invention

This invention relates to film cartridges of the type used in motion picture cameras and the like and, more particularly, to such a film cartridge adapted to receive a roll of motion picture film having a sound stripe on one surface of the film which projects from such surface.

2. Description of the Prior Art

Commonly assigned U.S. Pat. No. 3,208,686 entitled Film Cartridge, issued Sept. 28, 1965 in the name of E. A. Edwards et al., discloses a "super 8" film cartridge for motion picture cameras or the like wherein a coreless roll of motion picture film is positioned around (but not attached to) a stationary post in a supply chamber of the cartridge and is withdrawn from the chamber along a film path past an exposure aperture and is then wound onto a takeup core in a takeup chamber of the cartridge, the supply and takeup chambers being in substantially parallel planes and being co-axially disposed with respect to each other. As is well known in the art, the film supply roll in such a cartridge is coreless and therefore is subject to clockspringing, i.e., successive convolutions of the film roll may be displaced radially outwardly relative to the central axis of the roll due to the tendency of a coiled, unsecured film supply roll to unwind. It also is known to modify such cartridges to provide for recording of sound onto the film in the cartridge simultaneous with exposure of the various film frames to scene light. In this regard, reference is made to U.S. Pat. No. 3,442,580 issued May 6, 1969 in the name of A. Winkler. When such cartridges are loaded with film containing a magnetic stripe for recording of sound, the magnetic stripe typically is placed along one side edge of one surface of the film and adjacent the central area of the film where photographic emulsion on the other surface is exposed to scene light. A balance stripe is typically provided on the other side edge of that one surface of the film beside perforations in the film. Both the recording stripe and the balance stripe project from the surface of the film. Because the walls defining the supply chambers in the cartridge are spaced apart by a distance somewhat greater than the width of the film roll to minimize frictional contact therebetween, the various film convolutions can step in a random manner by a distance which allows a stepped convolution to overlap one of the stripes (e.g., the sound stripe) and contact one wall of the supply chamber. This problem is especially pronounced when the film has clocksprung as a result of handling during packaging, shipping etc. As noted before, this results in excessive frictional contact by the supply roll of film and at least one wall of the film supply chamber, and may result in unsatisfactory exposure of film in a camera. Attempts to force the stepped convolutions to return to their original position by surface formations on the walls of the cartridge chamber generally are not satisfactory due to the frictional contact between the stepped convolutions of the film and the adjacent convolutions.

SUMMARY OF THE INVENTION

It is an object of the present invention to provide a film cartridge which overcomes the difficulties encountered as a result of stepping of film in a supply roll of film in a cartridge.

Another object of the invention is to provide a film cartridge for motion picture film or the like having a sound stripe thereon wherein the film can be properly advanced through the cartridge and correctly exposed even though the supply roll of film in the cartridge has become clocksprung and/or stepped.

Another object of the invention is to avoid clockspringing of film in a motion picture cartridge or the like and thereby minimize the liklihood that the film will become stepped.

A still further object of the invention is to provide a film cartridge for motion picture film or the like having a sound stripe thereon with the film in the supply roll being subject to stepping, wherein the frictional forces between stepped convolutions of film and walls of the supply chamber in the cartridge can be reduced when the cartridge is loaded in the camera, thereby improving the operation of the cartridge in the camera.

In accordance with the invention a film cartridge is provided having a supply chamber for receiving a roll of convoluted film having a projecting stripe on one surface of the film. Means are provided for expanding the size of the chamber when the cartridge is placed in a camera or the like thereby minimizing frictional contact between stepped convolutions of the film roll in the supply chamber during unwinding of film from the roll. In accordance with another feature of the invention, the inner convolution of the film supply roll is held stationary until the cartridge is inserted into a camera, thereby minimizing clockspringing, stepping and the related problems.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 3 is an enlarged fragmentary view of a portion of the supply side of a film cartridge showing certain convolutions of film stepped in a manner which is considered undesirable;

FIG. 4 is a fragmentary cross section view of the cartridge shown in FIG. 1;

FIG. 5 is a view similar to FIG. 4 but illustrating the cartridge after insertion into a camera or the like; and FIG. 6 is a cross section view taken along line 6—6 in FIG. 4.

DESCRIPTION OF THE PREFERRED EMBODIMENTS

Because photographic apparatus is well known, the present description will be directed in particular to elements forming part of, or cooperating more directly with, the present invention, apparatus not specifically shown or described herein being understood to be selectable from those known in the art.

Figure 2:
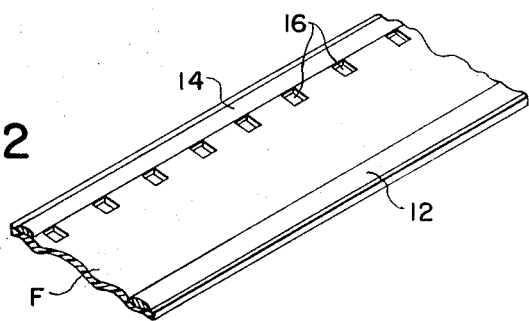
FIG. 2 is an enlarged perspective view of a portion of a film strip of the type loaded in the cartridge shown in FIG. 1.

Referring now to the drawings in detail, a film cartridge according to the present invention is generally designated 10 and is adapted to be loaded with film F. As best shown in the FIGS. 2 and 3, the film F may be a film strip having a stripe 12 of magnetic recording material along one side edge of one surface of the film and a balance stripe 14 along the other side edge of the same surface of the film. The balance stripe is located adjacent to a plurality of perforations 16 in the film strip, and the light sensitive emulsion on the film typically is located on the opposite (lower) surface of the film.

As noted earlier, sound film of the type shown in FIG. 2, when loaded in a super 8 film cartridge as disclosed in the beforementioned Edwards et al patent, tends to clockspring, and this allows the convolutions of the film to step randomly. In part, the clockspringing of the supply roll of film in the cartridge, and thus the resulting stepping of the various convolutions, occurs because the film in the supply chamber of the Edwards et al cartridge is a "coreless" roll of film, i.e., it is not attached to a reel, core or the like and therefore the inner convolution of film is not held stationary. FIG. 3 illustrates the stepping condition that can result from loading of film of the type shown in FIG. 2 in a cartridge as disclosed in the Edwards et al., patent. Thus FIG. 3 illustrates a coreless roll 20 of film F located in a supply chamber 22 of the film cartridge. The inner end F' of the film is unattached and loosely positioned around a stationary supply post 24. The film convolutions designated F1 and F2 have become stepped and the lower portions thereof frictionally contact the sound stripe 12 of the film convolutions radially inwardly of the convolutions F1 and F2. The film roll 20 rests on an antifriction disc 26 which may be of the type disclosed in the commonly assigned U.S. Pat. No. 3,208,685 issued Sept. 28, 1965 in the names of E. A. Edwards and A. J. Tucker and entitled Anti-Friction Disk for Strip Material Cartridge. Because of the anti-friction disc, the film roll can rotate relatively freely with respect to the bottom or inner wall 28 of the supply chamber in the cartridge. However, the stepped convolutions of film F1 and F2 contact the inner surface of the upper wall or cover 30 of the supply chamber and produce a friction force when the supply roll is rotated (as is necessary during advancement of film in a camera). This force increases the load required for proper advancement of film and, as noted earlier, can result in improper exposure of film.

Figure 1:
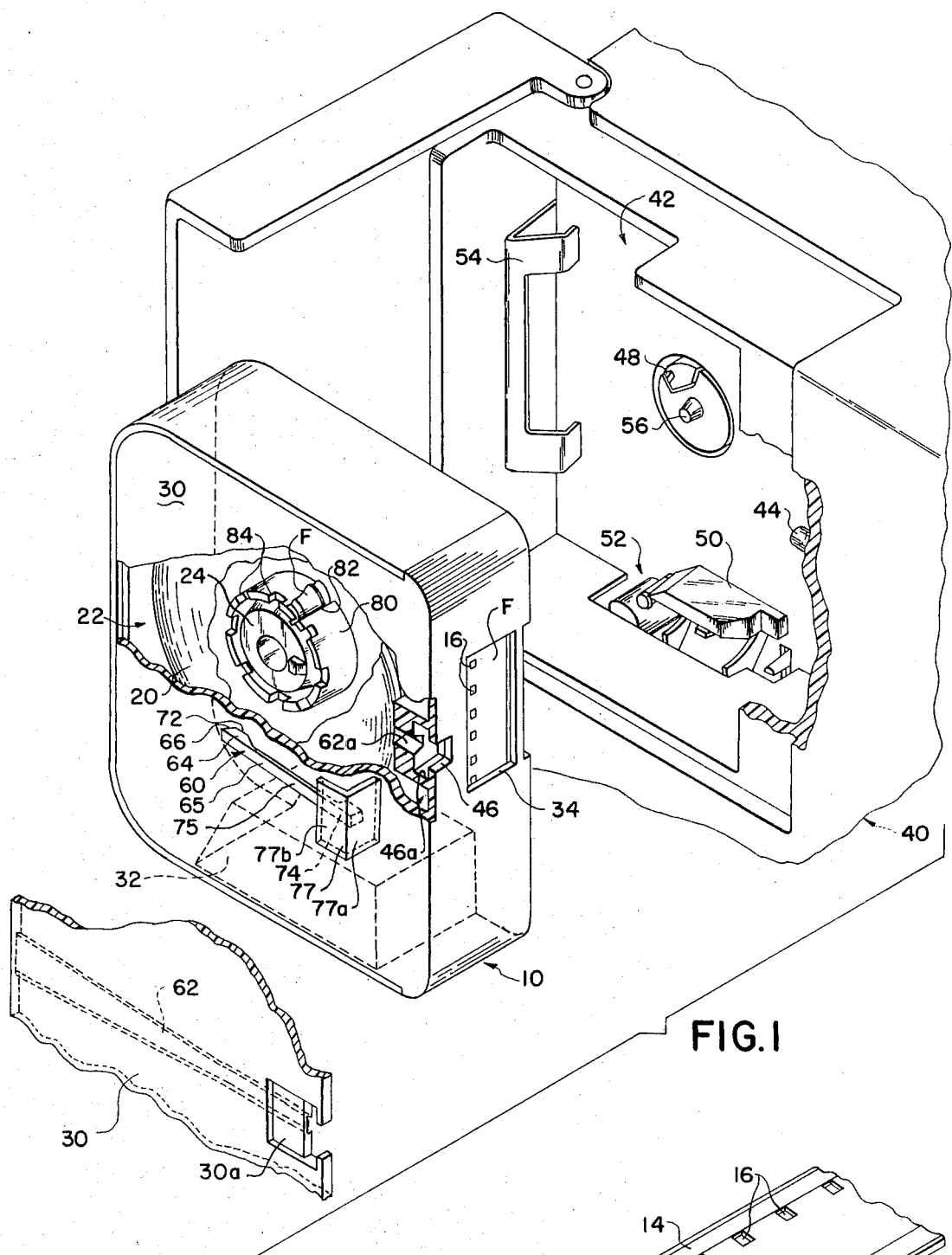
FIG. 1 is an exploded view, partially broken away, illustrating a cartridge constructed in accordance with the present invention and a portion of a motion picture camera or the like adapted to receive the cartridge.

To the extent the cartridge 10 incorporates the same or similar structures as described in connection with FIG. 3, the same reference numerals have been used to designate the same parts of the cartridge 10. Referring now to FIG. 1, 4 and 5, the sound cartridge 10 illustrated in the drawings includes a sound aperture 32 which opens to the bottom and backside of the cartridge (as viewed in FIG. 1) and is adapted to receive certain elements of sound apparatus in a camera. Film in supply chamber 22 is unwound in a counterclockwise direction and threaded past an exposure aperture 34 in the cartridge for exposure to scene light in a camera. The film is then advanced through the sound aperture 32 in the cartridge for recording of sound onto the film. Then the film is fed into a takeup chamber 36 located below wall 28 in a plane parallel to the plane of the supply chamber. As is well known in the art, film in the takeup chamber can be wound onto a core (not shown) that is substantially coaxial with the supply roll and post 24 in the supply chamber. Takeup chamber 36 and the core therein are disclosed in more detail in the beforementioned Edwards et al. patent. The takeup core can be made rotatable in the takeup direction only in a manner well known in the art, or the takeup core can be rotatable in the takeup direction only when the cartridge is outside of the camera and then rotatable in either direction after the cartridge is located in the camera, such as disclosed in the copending, commonly assigned U.S. Pat. application Ser. No. 323,019, filed Jan. 12, 1973 in the name of Archie J. Tucker and entitled Disengageable Anti-Backup Device For Film Cartridge.

The cartridge 10 is adapted to be positioned in a motion picture camera or the like, a portion of which is generally designated 40 in FIG. 1. Camera 40 comprises a cartridge chamber or compartment 42 having a locating pin 44 on one wall of the chamber which is adapted to be received by a locating notch 46 in the cartridge for locating the cartridge with respect to chamber 42. A drive member 48 projects through the back wall of the cartridge chamber and is engageable with the takeup core of the cartridge. The member 48 is rotated by a friction drive for rotating the core in a takeup direction during operation of the camera. A shroud 50 and certain elements of sound apparatus generally designated 52 are at least partially received in the sound aperture 32 of the cartridge for recording of sound on the magnetic stripe 12 of the film simultaneous with exposure of film through exposure aperture 34. The cartridge is urged toward the right (toward locating pin 44) by suitable spring means 54 in the cartridge chamber. A pin 56 can be provided for disengaging an anti-backup mechanism of the type disclosed in the beforementioned copending patent application in the name of Archie J. Tucker.

In accordance with the present invention means are provided for (1) expanding the size of the supply chamber 22 in the cartridge by spreading the cover 30 in an upward direction (as viewed in FIGS. 4 and 5) and/or (2) locking the inner convolution of the film supply roll 20 to control clockspringing and stepping of the roll. These means, singly or in combination, avoid the problems referred to hereinbefore which result from clockspringing and then stepping of the film roll. More specifically, in accordance with the present invention an elongate slider generally designated 60 is movable along a slot 62 in the cartridge cover 30 from an initial or extended position (FIG. 4) to a second, fully inserted position shown in FIG. 5 for effecting a bowing of the cover to enlarge the supply chamber 22. As shown in FIG. 6, the slot and slider can have complementary, dovetail-shaped portions for holding the slider in the slot. Slider 60 comprises an inner end portion 64 having a tapered ramp surface 66 that defines with the upper edge 65 of the slider a small acute angle. A complementary shaped ramp surface 68 is provided on an extension 70 on supply post 24 so that as the slider is moved from its FIG. 4 to its FIG. 5 position the surface 66 engages surface 68 and is cammed upwardly by that surface to bring the end portion 64 into engagement with the cover 30 and thereby force the cover into the bowed condition illustrated in FIG. 5 as end 64 becomes wedged between extension 70 and cover 30. The end portion 64 of the slider also has a surface 72 extending to the right from the ramp surface 66 and substantially parallel to the upper edge 65 of the slider. As shown in FIG. 5, surface 72 can ultimately ride along the top edge of the extension 70 of the supply post so that the thickness of the portion 64 as measured between surface 72 and the upper edge 65 of the slider determines the extent of bowing of cover 30 in response to movement of the slider. However, it will be understood that sufficient enlargement of supply chamber 22 can be achieved while ramp surfaces 66 and 68 are in contact, depending on the slope and length of the ramp surfaces, etc.

The other or outer end portion of the slider 60 is generally designated 74. End portion 74 is substantially rectangular in cross section as best illustrated in FIG. 1 and has a close fitting, sliding relationship with a complimentary shaped portion 62a of the slot 62. In order to minimize the possibility of light leak into the interior of the cartridge through slot portion 62, the slider has a cap 77 on the outer end thereof. The cap has a rectangular portion 77a that snaps into a recessed portion 46a of locating notch 46 as the slider is assembled into the cartridge by movement from right to left as viewed in FIGS. 4 and 5. The slider cap also has a rectangular portion 77b that extends from portion 77a to a groove 30a in the cover 30. The cap has a light-tight, sliding fit with the walls of the recessed portion 46a of the notch and with the groove 30a.

When ramp 66 in the end portion 64 of the slider is spaced from the ramp 68 as shown in FIG. 4, the inner part of the portion 74 of the slider is located in the portion 62a of the slot and the outer part of portion 74 projects into the locating notch 46 by a distance which is at least equal to the amount of travel required to move the slider from its FIG. 4 to its FIG. 5 position. When the cartridge 10 is positioned in the compartment 42 of the camera and locating pin 44 enters the notch 46, the slider is moved by the pin from its FIG. 4 to its FIG. 5 position to effect movement of the end portion 64 of the slider along ramp surface 68 for expanding the size of the supply chamber. It will be observed that the portion 75 of the slider between the end portions 64 and 74 is relatively thin so that it does not interfere with the film supply roll 20 and so that the slider can clear certain walls in the cartridge, such as the wall 76 which defines one side of the supply chamber in the cartridge.

Bowing of the cartridge cover 30 in the manner explained hereinbefore is effective to provide additional room in the cartridge supply chamber so that, in the event film becomes stepped in the manner illustrated in FIG. 3, the supply roll can still rotate freely after the cartridge is inserted into the camera, thereby avoiding the adverse effects from stepping of the film. However, in order to attempt to minimize stepping or eliminate stepping altogether, it is preferred that the inner convolution of film in the supply roll be held stationary before the cartridge is loaded into the camera, thereby counteracting the tendency of the supply roll to clockspring. One way this can be accomplished is by providing a core ring 80 around the supply post 24, and securing the inner end of the film strip to the ring. The film can be secured to the ring by tightly cinching the film end onto the ring during spooling of the film. Alternatively, the inner end of the film strip F can be attached to the ring 80 as shown in FIG. 1 by insertion of the film end through a slot 82 in the ring. The slot can be shaped and dimensioned with respect to the film strip to provide a sufficient frictional force to minimize or overcome the tendency of the supply core to clockspring by holding the film end tightly secured to the core ring. Ring 80 should be easily rotatable with respect to the supply post to minimize forces required to withdraw film from the supply roll during advancement of film in the camera. Therefore it is desirable to lock ring 80 in position until such time as the cartridge is loaded into the camera. Otherwise, the ring would rotate in response to forces exerted by the film roll tending to clockspring. Locking of the ring 80 can be accomplished by providing suitable latch means. In the embodiment illustrated, the latch means comprises a plurality of notches 84 in spaced relation around the upper edge of the core ring with each of the notches being of such size that the surface 72 of end portion 64 of the slider can be positioned in and slide through the notches as illustrated in FIGS. 4-6. When the slider is in the position shown in FIG. 4 the slider portion 64 effectively locks the ring against rotation and thereby avoids clockspringing of the film roll. However, when the slider is moved to the FIG. 5 position the surface 72 moves out of the notches 84 and permits free and substantially unimpeded rotation of the supply core ring along with the film roll. While only one notch 84 is necessary for the latching of the ring to the slider, a plurality of notches are desired since this facilitates assembly of the cartridge and positioning of the end portion 64 of the slider in one of the notches.

The problems resulting from stepping and referred to hereinbefore can be avoided by using either the slider to effect expansion of the supply chamber or by using the core ring to prevent clockspringing which, in turn, is typically accompanied by stepping of sound film. While the two solutions are capable of independent use without the other, the combination of solutions is desirable in that any stepping that might result from the cartridge incorporating only the core ring is clearly avoided by expansion of the supply chamber using the slider member.

The invention has been described in detail with particular reference to preferred embodiments thereof, but it will be understood that variations and modifications can be effected within the spirit and scope of the invention.

We claim:

1. In a film cartridge having walls defining a supply chamber for a roll of film or the like having an axis and a tendency to become stepped in an axial direction, the improvement comprising:

a slidable member mounted on said cartridge and positioned at least partially in the cartridge, said member being movable with respect to one of the chamber-defining walls along a path between a first position and a second position, the one wall being substantially perpendicular to and flexible along the axis of the film roll, and means located along the path of motion of said member for effecting the flexing of the one wall in response to movement of said member from its first position to its second position and thereby expand the chamber in the axial direction.

2. In a film cartridge for insertion into a camera having a pin for locating the cartridge, the cartridge having walls defining a supply chamber for a roll of film or the like having a tendency to become stepped in an axial direction, the improvement comprising:
a slidable member positioned at least partially in the cartridge and movable with respect to one of said chamber-defining walls along a path between a first position and a second position, said one wall being flexible;
means located along the path of said member for flexing said one wall in response to movement of said member from its first position to its second position and thereby expand the chamber;
means defining a notch in the cartridge for receiving the pin of the camera, thereby to locate the cartridge with respect to the camera;
said one wall of the chamber having a slot opening into the supply chamber and into the notch, and the slidable member being positioned in the slot and having an end portion projecting into the notch when the member is in its first position so that said end portion is engageable by the pin of the camera to effect movement of said member to its second position in response to positioning of the cartridge into the camera.

3. In a film cartridge having walls defining a supply chamber for a roll of film or the like having a tendency to become stepped in an axial direction, the improvement comprising:
a post in said supply chamber having a portion defining a cam surface; and
a slidable member positioned at least partially in the cartridge and movable with respect to one of said chamber-defining walls along a path between a first position and a second position, said one wall being flexible, and said slidable member having a ramp surface engageable with said cam surface during movement of said member from its first position to its second position to force said member against said one wall and thereby expand the chamber.

4. In a film cartridge having walls defining a supply chamber for a roll of film or the like having a tendency to become stepped in an axial direction, the improvement comprising:
a slidable member positioned at least partially in the cartridge and movable with respect to one of said chamber-defining walls along a path between a first position and a second position, said one wall being flexible;
means located along the path of said member for flexing said one wall in response to movement of said member from its first position to its second position and thereby expand the chamber;
a rotatable ring positioned in the supply chamber radially inwardly of the roll of film, an inner end portion of the film being secured to the ring; and
cooperating means on said ring and said slidable member (1) for latching said ring to said member to secure said ring against rotation when said member is in its first position and (2) for releasing said ring for rotation in the supply chamber when said member is in its second position.

5. In a film cartridge as set forth in claim 4 wherein said cooperating means comprises (1) at least one notch in an edge portion of said ring and (2) a portion of said slidable member receivable in said notch when said slidable member is in its first position.

6. In a film cartridge having walls defining a supply chamber for a roll of film or the like, said cartridge being adapted to be received in a camera and to cooperate with elements in the camera, the improvement comprising:
slider means supported by said cartridge, said slider means being actuatable by an element in said camera, and said slider means being adapted, upon actuation thereof by said camera element, to operatively engage one of said walls to move a portion of the wall in a direction to expand said chamber and thereby provide for free movement of said film out of said chamber.

* * * * *